(12) United States Patent
Wither et al.

(10) Patent No.: US 9,071,709 B2
(45) Date of Patent: Jun. 30, 2015

(54) METHOD AND APPARATUS FOR PROVIDING COLLABORATION BETWEEN REMOTE AND ON-SITE USERS OF INDIRECT AUGMENTED REALITY

(75) Inventors: Jason Robert Wither, Topanga, CA (US); Yun-Ta Tsai, Playa del Rey, CA (US); Thommen Korah, Marina Del Rey, CA (US)

(73) Assignee: Nokia Technologies Oy, Espoo (FI)

( * ) Notice: Subject to any disclaimer, the term of this patent is extended or adjusted under 35 U.S.C. 154(b) by 1126 days.

(21) Appl. No.: 13/077,010

(22) Filed: Mar. 31, 2011

(65) Prior Publication Data

US 2012/0249586 A1 Oct. 4, 2012

(51) Int. Cl.
*G06F 3/00* (2006.01)
*G06F 3/048* (2013.01)
*H04N 1/00* (2006.01)
*H04N 1/42* (2006.01)

(52) U.S. Cl.
CPC .... *H04N 1/00323* (2013.01); *H04N 2201/3273* (2013.01); *H04N 1/42* (2013.01); *H04N 2201/0084* (2013.01); *H04N 2201/3225* (2013.01); *H04N 2201/0089* (2013.01)

(58) Field of Classification Search
CPC ... G06Q 10/10; G06Q 10/107; G06Q 10/109; G06F 3/0481; H04L 12/1822
USPC .......................................................... 715/751
See application file for complete search history.

(56) References Cited

U.S. PATENT DOCUMENTS 6,215,498 B1 4/2001 Filo et al.
2002/0188678 A1 12/2002 Edecker et al.

2004/0189675 A1 9/2004 Pretlove et al.
2008/0229215 A1 9/2008 Baron et al.
2009/0289956 A1 11/2009 Douris et al.

(Continued)

FOREIGN PATENT DOCUMENTS

EP 1 435 737 A1 7/2004

OTHER PUBLICATIONS

"Critical-Gaming Network" website, "Co-Unter-Op Design" blog entry dated Nov. 9, 2009, http://critical-gaming.com/blog/2009/11/9/co-unter-op-design.html, retrieved Nov. 21, 2014.*

(Continued)

*Primary Examiner* — Doon Chow
*Assistant Examiner* — Shourjo Dasgupta
(74) *Attorney, Agent, or Firm* — Alston & Bird LLP

(57) ABSTRACT

An apparatus for enabling provision of collaboration of remote and on-site users of indirect augmented reality may include at least one processor and at least one memory including computer program code. The at least one memory and the computer program code may be configured, with the processor, to cause the apparatus to perform at least selecting a stored image including a virtual representation of a real world location based on position information and orientation information of a mobile terminal, causing provision of first visual content to be displayed at the mobile terminal based on the virtual representation, causing provision of second visual content to be displayed at a remote device based on the virtual representation, and enabling collaborative interaction between a user of the mobile terminal and a user of the remote device with respect to the first visual content and the second visual content. A corresponding method and computer program product are also provided.

19 Claims, 7 Drawing Sheets

(56) References Cited

U.S. PATENT DOCUMENTS

| | | |
|---|---|---|
| 2010/0103075 A1 | 4/2010 | Kaláboukis et al. |
| 2010/0325563 A1 | 12/2010 | Goldthwaite et al. |
| 2011/0227919 A1* | 9/2011 | Bongio et al. ............... 345/426 |
| 2012/0025976 A1* | 2/2012 | Richey et al. ............ 340/539.13 |
| 2012/0105475 A1* | 5/2012 | Tseng ........................ 345/633 |
| 2012/0240077 A1* | 9/2012 | Vaittinen et al. ............. 715/781 |
| 2013/0021373 A1* | 1/2013 | Vaught et al. ................ 345/633 |

OTHER PUBLICATIONS

Wenjun Ma, "AMMP-EXTN: A User Privacy and Collaboration Control Framework for a Multi-User Collaboratory Virtual Reality System", published Oct. 1, 2007 at http://scholarworks.gsu.edu/cs_theses/50.*

Huanhai Yang and Gary M. Olson, "Exploring Collaborative Navigation: the Effect of Perspectives on Group Performance", published for CVE'02 Sep. 30-Oct. 2, 2002 in Bonn, Germany.*

Benko, H., et al; "Collaborative Mixed Reality Visualization of an Archaeological Excavation"; Proceedings of the International Symposium on Mixed and Augmented Reality; Arlington, VA; Nov. 2004.

Piekarski, W., et al.; "Integrating Virtual and Augmented Realities in an Outdoor Application"; IEEE 2nd International Workshop on Augmented Reality; San Francisco, CA; Oct. 2001; pp. 45-54.

Reitinger, B., et al.; "Augmented Reality Scouting for Interactive 3D Reconstruction"; IEEE Virtual Reality Conference; Charlotte, NC; Mar. 2007; pp. 219-222.

International Search Report and Written Opinion from International Patent Application No. PCT/FI2012/050096, mailed May 25, 2012.

* cited by examiner

METHOD AND APPARATUS FOR PROVIDING COLLABORATION BETWEEN REMOTE AND ON-SITE USERS OF INDIRECT AUGMENTED REALITY

TECHNOLOGICAL FIELD

Embodiments of the present invention relate generally to user interface technology and, more particularly, relate to a method and apparatus for enabling provision of collaboration between remote and on-site users of indirect augmented reality.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, mobile terminals may enhance the interaction that users have with their environment. Numerous use cases have developed around the concept of utilizing mobile terminals to enhance user interaction with their local area such as, for example, virtual tour guides and other mixed reality applications. Mixed reality involves the merging of real and virtual worlds. In some cases, mixed reality involves mixing real world image data with virtual objects in order to produce environments and visualizations in which physical and digital objects co-exist and potentially also interact in real time. Mixed reality includes augmented reality, which uses digital imagery to augment or add to real world imagery, and virtual reality, which simulates real world environments using computer simulation.

When incorporating augmented reality into a particular application or scenario, a user may be enabled to capture a live image or utilize a captured real world image and then add information to the image. A very common example of augmented reality is experienced frequently when watching a sporting event on television with streaming or otherwise intermittently presented score or other status information being overlaid onto the video of the sporting action itself. In the score or status information example described above, the augmentation has almost no relationship with the imagery it is augmenting. Accordingly, the augmentation can simply appear in a fixed location without any regard to what is going on in the real world imagery. However, when a virtual object is to be used to augment an image in the augmented reality situation, and the virtual object is desired to be correlated to a specific object or location within the image, the specific object or location must be tracked so that the virtual object can be positioned properly. However, this type of tracking can be difficult to maintain in many instances.

Based on the description above, it can be appreciated that mixed reality is complicated enough when practiced on a single device. Thus, employment of mixed reality use cases may be even more complex when some form of collaboration is desired where multiple users share a mixed reality environment. Due to the complexity and the large amounts of bandwidth and processing resources that are typically required to handle such situations, such collaboration may be limited to previously known or prepared environments or to situations where all collaborators are collocated. Accordingly, it may be desirable to provide an alternative mechanism by which to provide a collaborative mixed reality experience to users.

BRIEF SUMMARY

A method, apparatus and computer program product are therefore provided for enabling the provision of collaboration between remote and on-site users of indirect augmented reality. Indirect augmented reality, or localized virtual reality, may be a mixed reality experience in which information regarding a user's current location and device orientation is used to determine a corresponding panoramic view or other virtual representation to display. Digital data such as a virtual object or other type of enhancement may then be displayed with respect to the panoramic view or other virtual representation to simplify object tracking issues. Using indirect augmented reality, both on-site and remote users may collaborate, even in previously unknown or unprepared environments.

In one example embodiment, a method of providing collaboration between remote and on-site users of indirect augmented reality is provided. The method may include selecting a stored image including a virtual representation of a real world location based on position information and orientation information of a mobile terminal, causing provision of first visual content to be displayed at the mobile terminal based on the virtual representation, causing provision of second visual content to be displayed at a remote device based on the virtual representation, and enabling collaborative interaction between a user of the mobile terminal and a user of the remote device with respect to the first visual content and the second visual content.

In another example embodiment, a computer program product for providing collaboration between remote and on-site users of indirect augmented reality is provided. The computer program product includes at least one computer-readable storage medium having computer-executable program code instructions stored therein. The computer-executable program code instructions may include program code instructions for selecting a stored image including a virtual representation of a real world location based on position information and orientation information of a mobile terminal, causing provision of first visual content to be displayed at the mobile terminal based on the virtual representation, causing provision of second visual content to be displayed at a remote device based on the virtual representation, and enabling collaborative interaction between a user of the mobile terminal and a user of the remote device with respect to the first visual content and the second visual content.

In another example embodiment, an apparatus for providing collaboration between remote and on-site users of indirect augmented reality is provided. The apparatus may include at least one processor and at least one memory including computer program code. The at least one memory and the computer program code may be configured, with the processor, to cause the apparatus to perform at least selecting a stored image including a virtual representation of a real world location based on position information and orientation information of a mobile terminal, causing provision of first visual content to be displayed at the mobile terminal based on the virtual representation, causing provision of second visual content to be displayed at a remote device based on the virtual representation, and enabling collaborative interaction between a user of the mobile terminal and a user of the remote device with respect to the first visual content and the second visual content.

Embodiments of the invention may provide a method, apparatus and computer program product for employment in devices so that, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
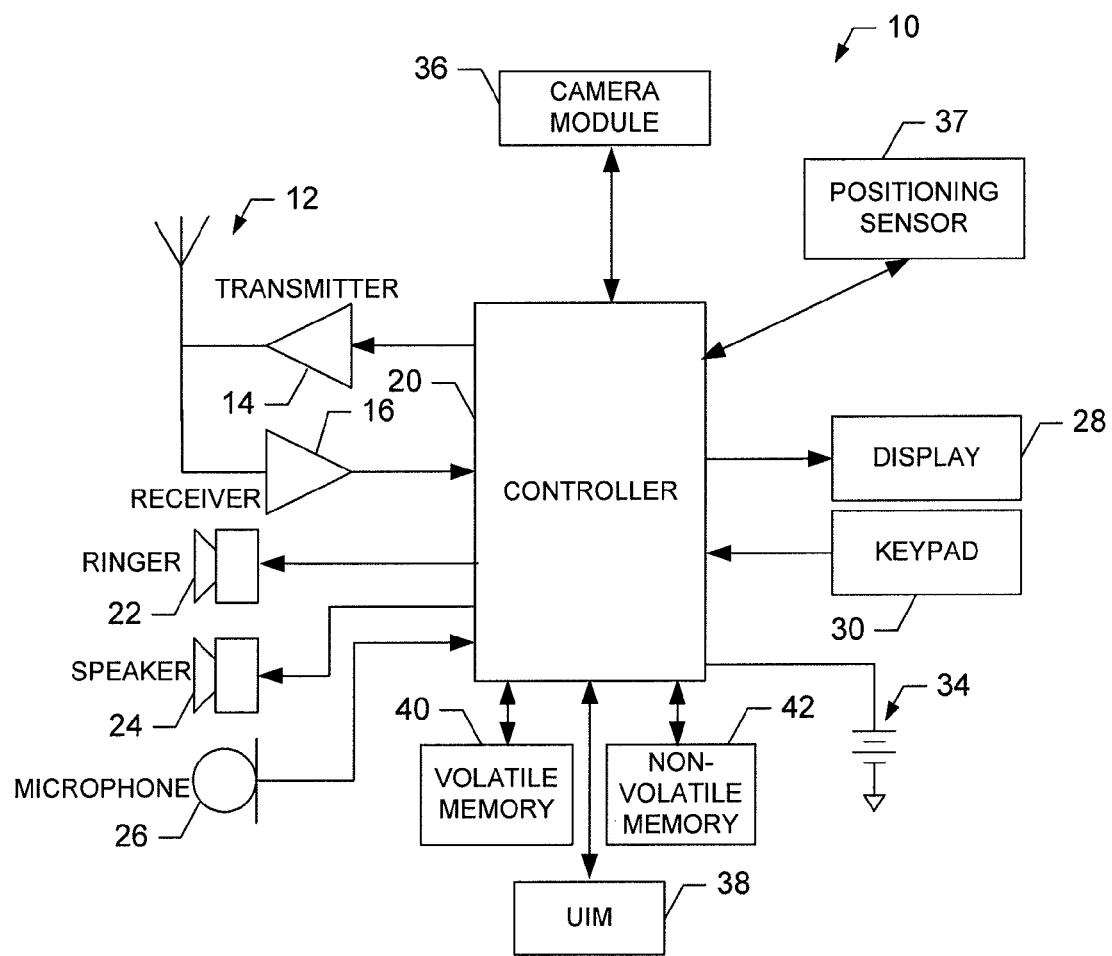
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Existing augmented reality environments in which unlimited processing resources are available may attempt to perform pixel level object tracking in order to provide a relatively realistic enhancement for mixed reality presentation purposes. However, for devices with limited processing resources, such as many mobile terminals, performing pixel level tracking may not be practical or desirable. The desire to avoid such complex processing may be further enhanced when collaboration between on-site and remote users is contemplated. For collaboration involving augmented reality, the on-site user would typically be responsible for providing some sort of live view to the remote user, so that the live view could be augmented with mixed reality aspects. The amount of processing power and bandwidth required for such collaboration may be prohibitive. Thus, this type of situation is often limited to situations where the environment is modeled before hand.

However, using indirect augmented reality, collaboration between on-site and remote users may be improved while using fewer resources. Indirect augmented reality employs virtual representations such as panoramic views of the location of the on-site user. Since the panoramic views may be provided to both the remote user and the on-site user by a service platform, and not from the on-site device, both the remote and on-site users may share similar information with less initial overhead. To support indirect augmented reality, built in accelerometers and/or magnetometers may be used to give an approximation of user orientation and a positioning sensor may be used to determine location. Studies have shown that the common experience of most camera users is that the image of a particular scene as seen through the user's eye is different than the image seen on a display pointing roughly in the same direction. Accordingly, replacing a live or current real world panoramic view image with a stored panoramic view image taken previously at nearly the same location and orientation is likely to produce an image that is perceptually agreeable to most users. In this regard, the small differences in perspective that may result may not be much different than the user would expect due to normal differences the user has experienced in the past. By utilizing stored panoramic view image data, tracking real objects and correlating virtual objects to the real objects may actually be much easier with respect to the stored image than it would be for the real image. Thus, collaboration may be achieved in a useful manner, while also consuming or requiring fewer resources.

Some embodiments of the present invention may therefore be employed to, for example, provide an ability for a mobile terminal at a particular location to communicate its position and perhaps also orientation to a service platform that may then provide stored panoramic image data (or other virtual representations of a real world location) to the mobile terminal and to a remote user. Thus, the mobile terminal and the remote user may each be presented with an indirect augmented reality view (or localized virtual reality view) that simplifies the tracking issues that can be problematic in an augmented reality environment. In some examples, information regarding the on-site user's current location may be used along with information indicative of the orientation the on-site user's device in order to determine a corresponding panoramic view to provide to the mobile terminal (of the on-site user) and to the remote user. A virtual object or other type of enhancement may then be displayed with respect to the panoramic view to simplify object tracking. An example embodiment will be described below using a panoramic view as an example of a virtual representation used in connection with employing the concepts described herein. However, it should be appreciated that these concepts can also be applied using other virtual representations such as 3D models or textured versions of the real world.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processor, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an example embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format. In some cases, the camera module 36 may provide live image data to the display 28. Moreover, in an example embodiment, the display 28 may be located on one side of the mobile terminal 10 and the camera module 36 may include a lens positioned on the opposite side of the mobile terminal 10 with respect to the display 28 to enable the camera module 36 to capture images on one side of the mobile terminal 10 and present a view of such images to the user positioned on the other side of the mobile terminal 10.

In addition, the mobile terminal 10 may include a positioning sensor 37. The positioning sensor 37 may include, for example, a global positioning system (GPS) sensor, an assisted global positioning system (A-GPS) sensor, a Bluetooth (BT)-GPS mouse, other GPS or positioning receivers or the like. However, in one example embodiment, the positioning sensor 37 may include a pedometer or inertial sensor. In this regard, the positioning sensor 37 may be capable of determining a location of the mobile terminal 10, such as, for example, longitudinal and latitudinal directions of the mobile terminal 10, or a position relative to a reference point such as a destination or start point. Information from the positioning sensor 37 may then be communicated to a memory of the mobile terminal 10 or to another memory device to be stored as a position history or location information. In this regard, for example, the position history may define a series of data points corresponding to positions of the mobile terminal 10 at respective times. Various events or activities of the mobile terminal 10 may also be recorded in association with position history or location information provided by the positioning sensor 37.

In some embodiments, the positioning sensor 37 may further include components for determining orientation (e.g., an orientation module). However, in other embodiments the orientation module may be provided as a separate component. The orientation module may be a device (e.g., electronic compass, a horizon sensor, gravity sensor, accelerometer, gyroscope, magnetometer and/or the like or any other sensor that may be useful in determining orientation information) configured to determine the orientation of mobile terminal 10 relative to a reference. In some cases, the reference may be a particular direction, such as North or another cardinal direction. However, other references could also be employed. As such, in some embodiments, the orientation module may include a compass or other orientation sensor configured to determine the heading of the mobile terminal 10 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module 36 or simply an initial orientation. As such, in some cases, orientation may be determined by reconciling a current camera view with images (e.g., panoramic images) previously taken at the location of the mobile terminal 10.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
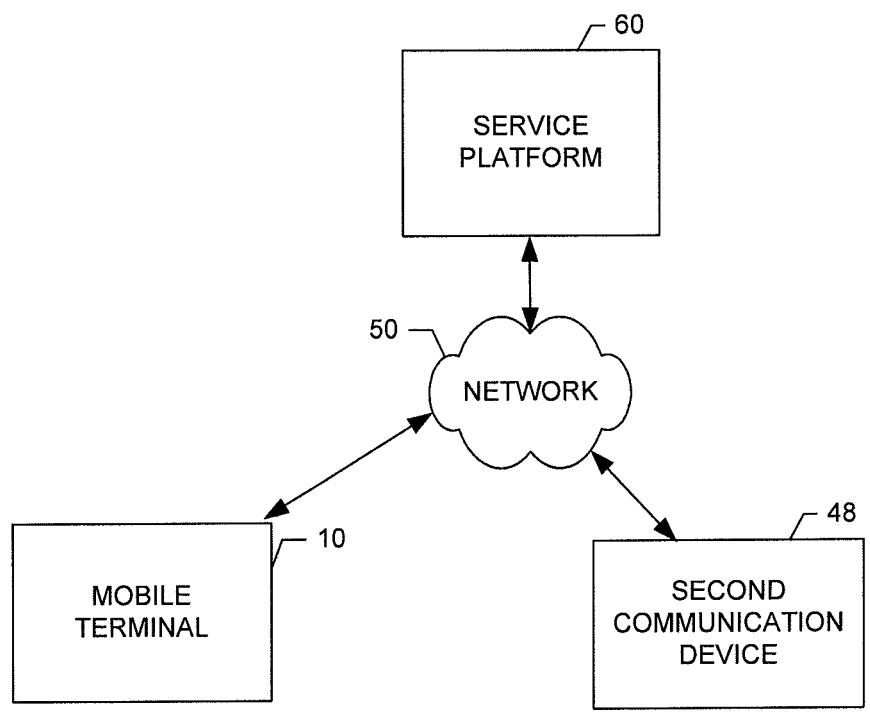
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention includes a first communication device (e.g., mobile terminal 10) and in some cases also a second communication device 48 that may each be capable of communication with a network 50. For purposes of the discussion herein, the first communication device or mobile terminal 10 may be considered to be synonymous with an on-site device associated with an on-site user. The second communication device 48 may be considered to be synonymous with a remote device associated with a remote user. The second communication device 48 may be a remotely located user of another mobile terminal, or a user of a fixed computer or computer terminal (e.g., a personal computer (PC)). However, it should be appreciated that, in some examples, multiple devices (either locally or remotely) may collaborate with each other and thus example embodiments are not limited to scenarios where only two devices collaborate. Thus, there may be multiplicity with respect to instances of other devices that may be included in the network 50 and that may practice example embodiments. The communications devices of the system may be able to communicate with network devices or with each other via the network 50. In some cases, the network devices with which the communication devices of the system communicate may include a service platform 60. In an example embodiment, the mobile terminal 10 (and/or the second communication device 48) is enabled to communicate with the service platform 60 to provide, request and/or receive information. However, in some embodiments, not all systems that employ embodiments of the present invention may comprise all the devices illustrated and/or described herein.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like.

One or more communication terminals such as the mobile terminal 10 and the second communication device 48 may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 48 via the network 50. By directly or indirectly connecting the mobile terminal 10, the second communication device 48 and other devices to the network 50, the mobile terminal 10 and the second communication device 48 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 48, respectively.

Furthermore, although not shown in FIG. 2, the mobile terminal 10 and the second communication device 48 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 48 may be enabled to communicate with the network 50 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 60 may be a device or node such as a server or other processing device. The service platform 60 may have any number of functions or associations with various services. As such, for example, the service platform 60 may be a platform such as a dedicated server (or server bank) associated with a particular information source or service (e.g., an indirect augmented reality service, a mapping service, a search service, etc.), or the service platform 60 may be a backend server associated with one or more other functions or services. As such, the service platform 60 represents a potential host for a plurality of different services or information sources. In some embodiments, the functionality of the service platform 60 is provided by hardware and/or software components configured to operate in accordance with known techniques for the provision of information to users of communication devices. However, at least some of the functionality provided by the service platform 60 is information provided in accordance with example embodiments of the present invention.

In an example embodiment, the service platform 60 may host an apparatus for providing a collaborative indirect augmented reality service and/or may host an image provision service that provides panoramic images to a device practicing an embodiment of the present invention. As such, in some embodiments, the service platform 60 may itself perform example embodiments, while in other embodiments, the service platform 60 may facilitate (e.g., by the provision of image data) operation of an example embodiment at another device (e.g., the mobile terminal 10 and/or the second communication device 48). In still other example embodiments, the service platform 60 may not be included at all.

An example embodiment will now be described with reference to FIG. 3, in which certain elements of an apparatus for enabling the provision of collaboration between remote and on-site users of indirect augmented reality are displayed. The apparatus of FIG. 3 may be employed, for example, on the service platform 60 of FIG. 2. However, it should be noted that the apparatus of FIG. 3, may also be employed on a variety of other devices. Therefore, example embodiments should not be limited to application on devices such as the service platform 60 of FIG. 2. Alternatively, embodiments may be employed on a combination of devices including, for example, those listed above. Accordingly, some example embodiments may be embodied wholly at a single device (e.g., the service platform 60) or by devices in a client/server relationship (e.g., the service platform 60 serving information to the mobile terminal 10 and/or the second communication device 48). Furthermore, it should be noted that the devices or elements described below may not be mandatory and thus some may be omitted in certain embodiments.

Figure 3:
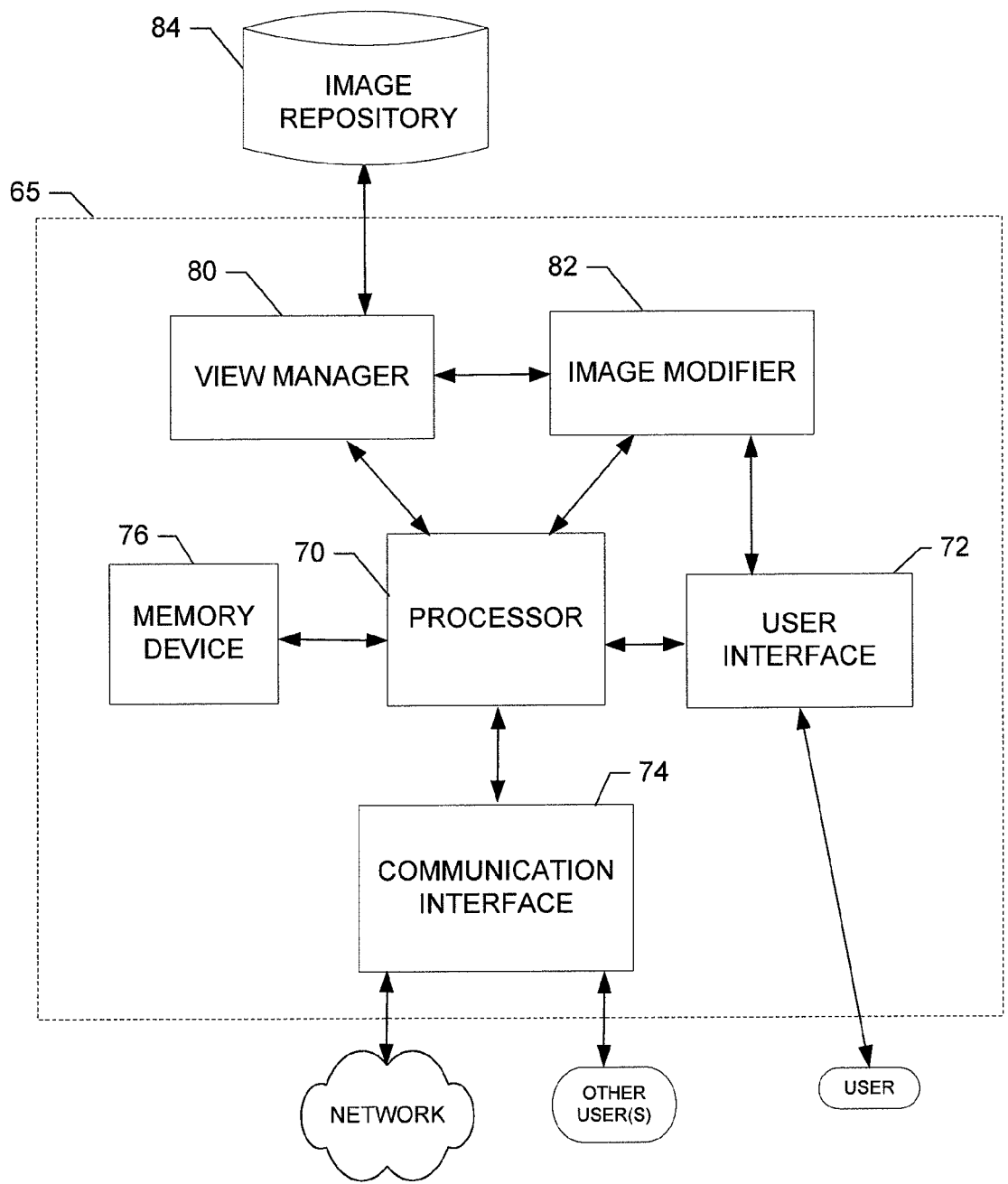
FIG. 3 is a schematic block diagram of an apparatus for providing collaboration between remote and on-site users of indirect augmented reality according to an example embodiment of the present invention.

Referring now to FIG. 3, an apparatus 65 for enabling the provision of collaboration between remote and on-site users of indirect augmented reality is provided. The apparatus 65 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The apparatus 65 may, in some embodiments, be a network device (e.g., service platform 60) that may be configured to provide information to two collaborating devices including an on-site device (e.g., the mobile terminal 10) and a remote device (e.g., the second communication device 48). However, in some embodiments, the apparatus 65 may be instantiated at either or both of the on-site device and the remote device. Thus, the apparatus 65 may be any computing device configured to employ an example embodiment of the present invention. However, in some embodiments, the apparatus 65 may be embodied as a chip or chip set (which may in turn be employed at one of the devices mentioned above). In other words, the apparatus 65 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 65 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. In an example embodiment in which the apparatus 65 is embodied as a server or some other network devices, the user interface 72 may be limited, or eliminated. However, in an embodiment in which the apparatus 65 is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a view manager 80 and an image modifier 82. As such, in some embodiments, the processor 70 may be said to cause, direct or control the execution or occurrence of the various functions attributed to the view manager 80 and the image modifier 82, respectively, as described herein. The view manager 80 and the image modifier 82 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the view manager 80 and the image modifier 82, respectively, as described herein. Thus, in examples in which software is employed, a device or circuitry (e.g., the processor 70 in one example) executing the software forms the structure associated with such means.

In an example embodiment, the view manager 80 may be configured to receive position information and in some cases also orientation information from an on-site device (e.g., the mobile terminal 10). Based on the location information (and in some cases also the orientation information), the view manager 80 may determine an image to select for provision as a display view for the on-site device and a remote device (e.g., the second communication device 48). When orientation information is used, the orientation of mobile terminal 10 and/or of the field of view of the camera module 36 of the mobile terminal 10 may be used to select an orientation for the image selected. In some cases, the orientation of the mobile terminal 10 may be determined relative to a reference and may be provided by the mobile terminal 10. However, in other cases, orientation information may simply be data that can be used by the view manager 80 to determine the orientation of the mobile terminal 10 relative to the reference. The reference may be, for example, a particular direction (e.g., North or another cardinal direction) or some other reference. In some embodiments, the location and/or orientation information may also be used to determine the heading of the mobile terminal 10 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation. In some example embodiments, the orientation of the field of view of the camera module 36 may be compared to the reference in order to determine the current orientation of the mobile terminal 10 as the orientation information. The orientation information may be determined only with reference to a single plane (e.g., parallel to the surface of the earth), or may be determined with respect to an elevation aspect and/or axial aspect shifts. Thus, for example, pitch and/or yaw of the mobile terminal 10 (e.g., pitch defining a degree of elevation and yaw defining an axial rotation) may also be determined as orientation information in some embodiments.

Accordingly, the view manager 80 may be configured to receive the position information indicative of the current location (or position) of the mobile terminal 10 (e.g., from the position sensor 36) and perhaps also the orientation information indicative of an orientation of the mobile terminal 10 with respect to the current location to perform image selection. In other words, in some cases, the view manager 80 may also receive orientation information indicative or descriptive of the orientation of the mobile terminal 10 (relative to a reference) so that a field of view that the mobile terminal 10 would be expected to have at the current location may be determined based on the current location and the orientation information so that image selection can be made in consideration of the location and orientation of the on-site device. The view manager 80 may then retrieve (or request) an image from an image repository 84 that correlates to both the current location and the orientation information. Notably, the image from the image repository may be a stored panoramic image previously captured at approximately the same location and/or orientation. However, in some embodiments, the image may actually be a stored panoramic view that represents at least one or more virtual augmentations to a previously captured image taken at approximately the same location and/or orientation. As such, for example, in some cases the image could be enhanced to include one or more virtual objects thereon.

The image repository 84 may be a portion of the memory device 76 or may be an external memory or database that includes a plurality of images. In embodiments in which the image repository 84 is collocated with the view manager 80 at the apparatus 65 (e.g., at the service platform 60), the image repository 84 may be a portion of the memory device 76. The images stored in the image repository 84 may be panoramic images that are associated with particular locations and orientations. Thus, upon receiving the position information indicative of the current location and orientation information indicative of on-site device orientation, the view manager 80 may be equipped to select (or request) a corresponding panoramic image from the image repository 84 that provides an image captured previously at approximately the same location with approximately the same orientation. In some cases, the panoramic images may be images associated with an existing mapping service that may be publicly available via the Internet. However, in other cases, the panoramic images may be a private collection of images associated with a particular location, area, business, museum, tour, or entity. For example, the panoramic images may be previously acquired via a service that drives through locations and takes panoramic images of the locations while driving through.

In some embodiments, the view manager 80 may select a particular image from the image repository 84 after receipt of the location information and the orientation information. However, in other embodiments, some images may be pre-fetched based on location information, perhaps before orientation information is known or before a specific panoramic image is requested. The pre-fetched images may be received from a remote source and stored locally so that computation resource consumption may be reduced when searching for a specific image to match the current location and orientation information when it is time to retrieve a panoramic image since a smaller set of images may need to be dealt with during the search operation.

In some cases, the image repository 84 may include multiple images associated with the same location and orientation. For example, multiple images having different lighting conditions may be stored in association with each respective location and orientation in order to enable images to be retrieved that correspond to the current time of day (e.g., day, night, morning, evening, etc.) and/or the current weather conditions (e.g., cloudy, sunny, rainy, etc.). As such, the view manager 80 may reference information sources such as weather reports and/or a local clock in association with retrieving or requesting specific panoramic images from the image repository 84.

After selection of an image based on the position information and orientation information, the image selected may be provided to the on-site device and the remote device for display. Updates to the position and/or orientation of the on-site device may be received at the view manager 80 periodically, at regular intervals, or in response to specific events (e.g., movement or orientation changes above a threshold amount). As the position information and orientation information are updated, the view manager 80 may correspondingly select different images and/or adjust the orientation of images to be presented at the on-site device and/or the remote device to correspond to the perceived changes in position information and orientation information.

Figure 4:
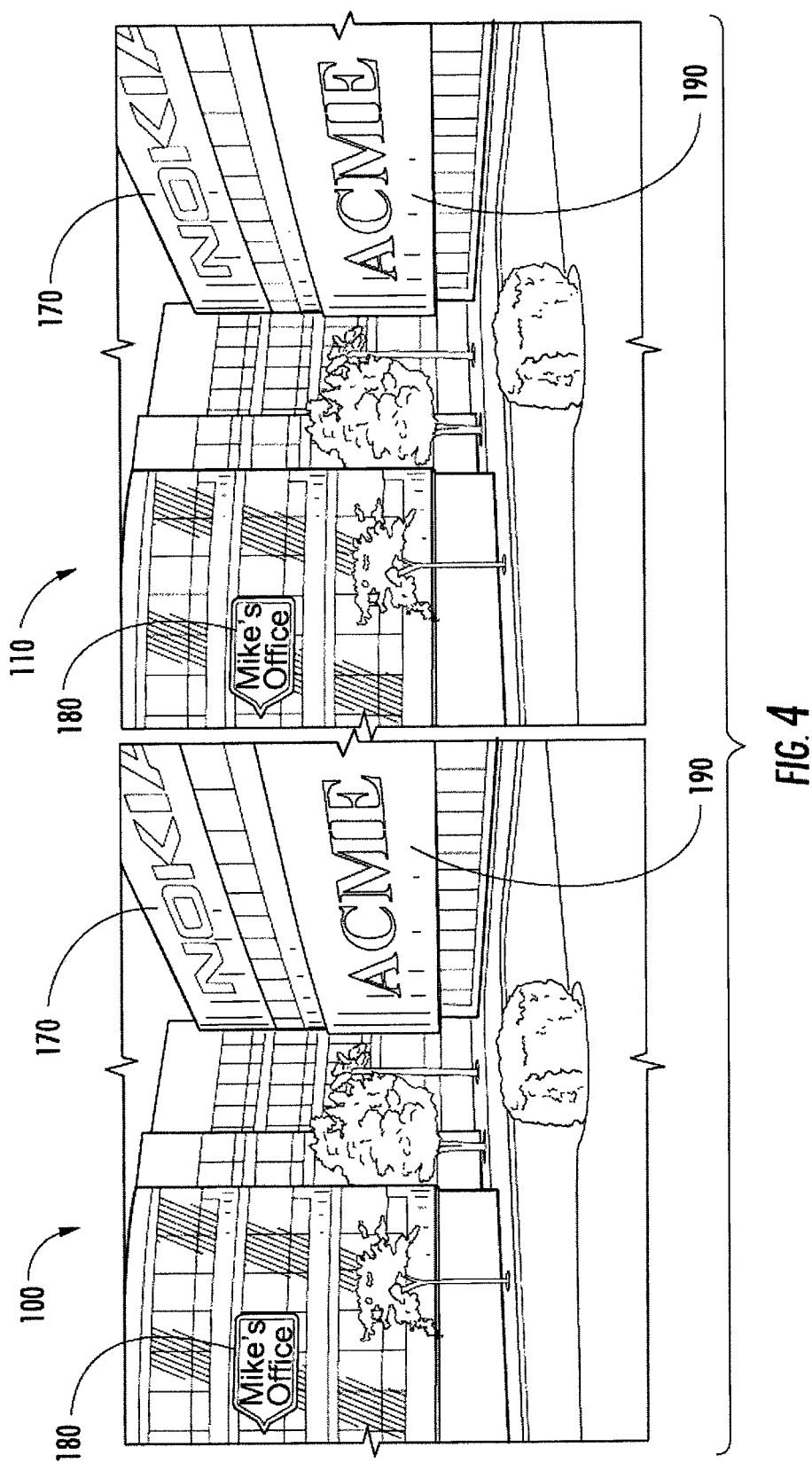
FIG. 4 illustrates an example in which an on-site view and a remote view are matched according to an example embodiment.

In some example embodiments, the view provided by the view manager 80 to the on-site device and the remote device may be matched. Thus, the view manager 80 may provide the same image with the same viewpoint and orientation to each of the on-site device and the remote device. Although not required, when a view is provided to each of the on-site device and the remote device based on an image displayed from the same viewpoint and orientation, the viewpoint and orientation may be selected based on the on-site device location and orientation. FIG. 4 illustrates an example in which the on-site view 100 and the remote view 110 are matched according to an example embodiment.

Figure 5:
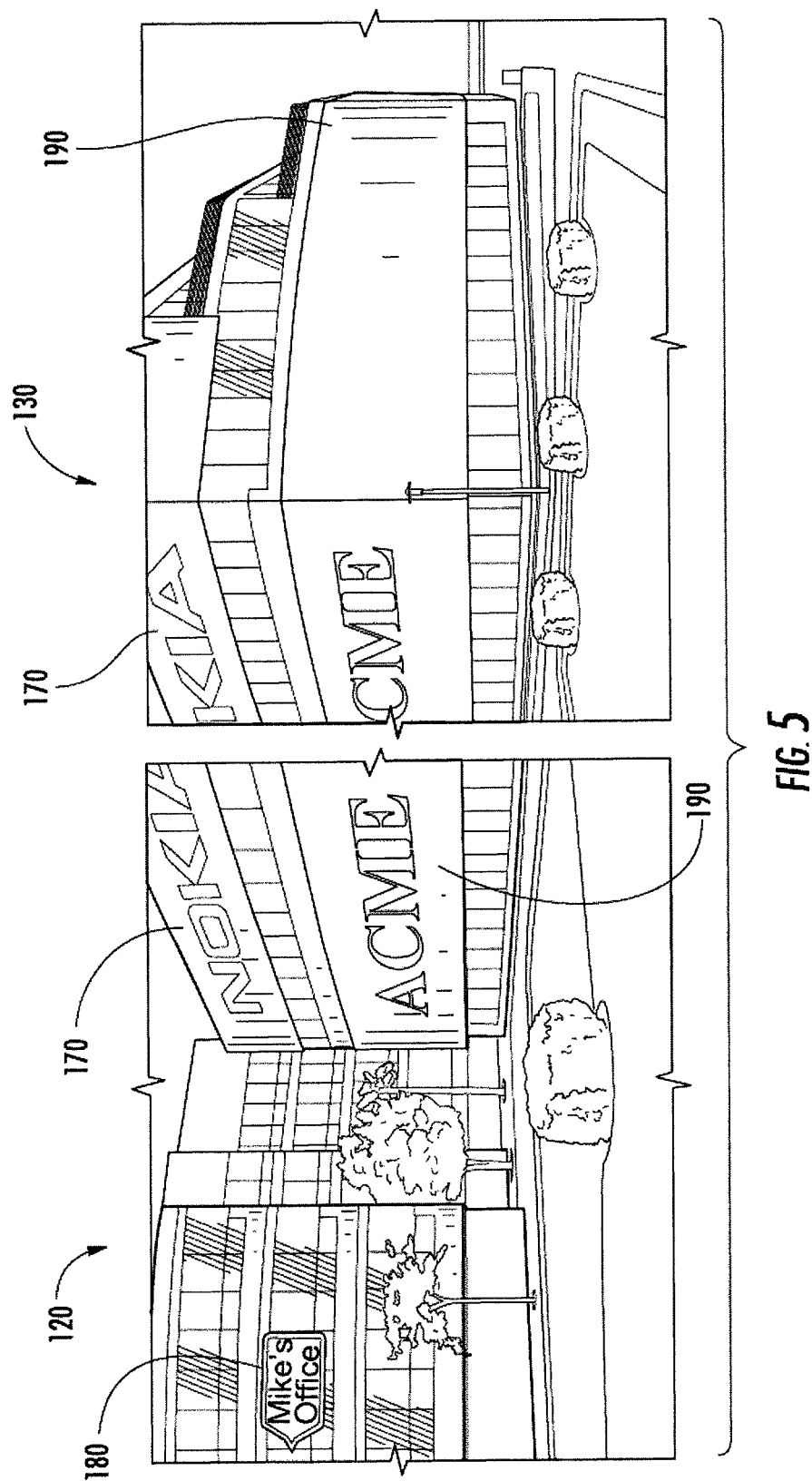
FIG. 5 illustrates an example in which the on-site view and the remote view are different based on the same viewpoint, but different orientations according to an example embodiment.

As an alternative, some embodiments may enable the view manager 80 to provide a different view on the on-site device than the view provided on the remote device. For example, in some cases, the view manager 80 may be configured to force the remote device and the on-site device to share the same viewpoint (e.g., the viewpoint of the on-site device), but permit changes to the orientation. In such an example, the orientation of the view shown at the remote device may be controllable by the user of the remote device. For example, the user of the remote device may provide an input to steer the orientation of the view provided at the remote device. As another example, the view at the remote device may remain fixed, while the view at the on-site device may change based on changes in orientation of the on-site device up to a certain threshold. Once the threshold is reached, for example, the orientation of the remote device may be updated. This may prevent continued updating of the views of both devices and reduce communication requirements. FIG. 5 illustrates an example in which the on-site view 120 and the remote view 130 are different based on the same viewpoint, but different orientations according to an example embodiment.

Figure 6:
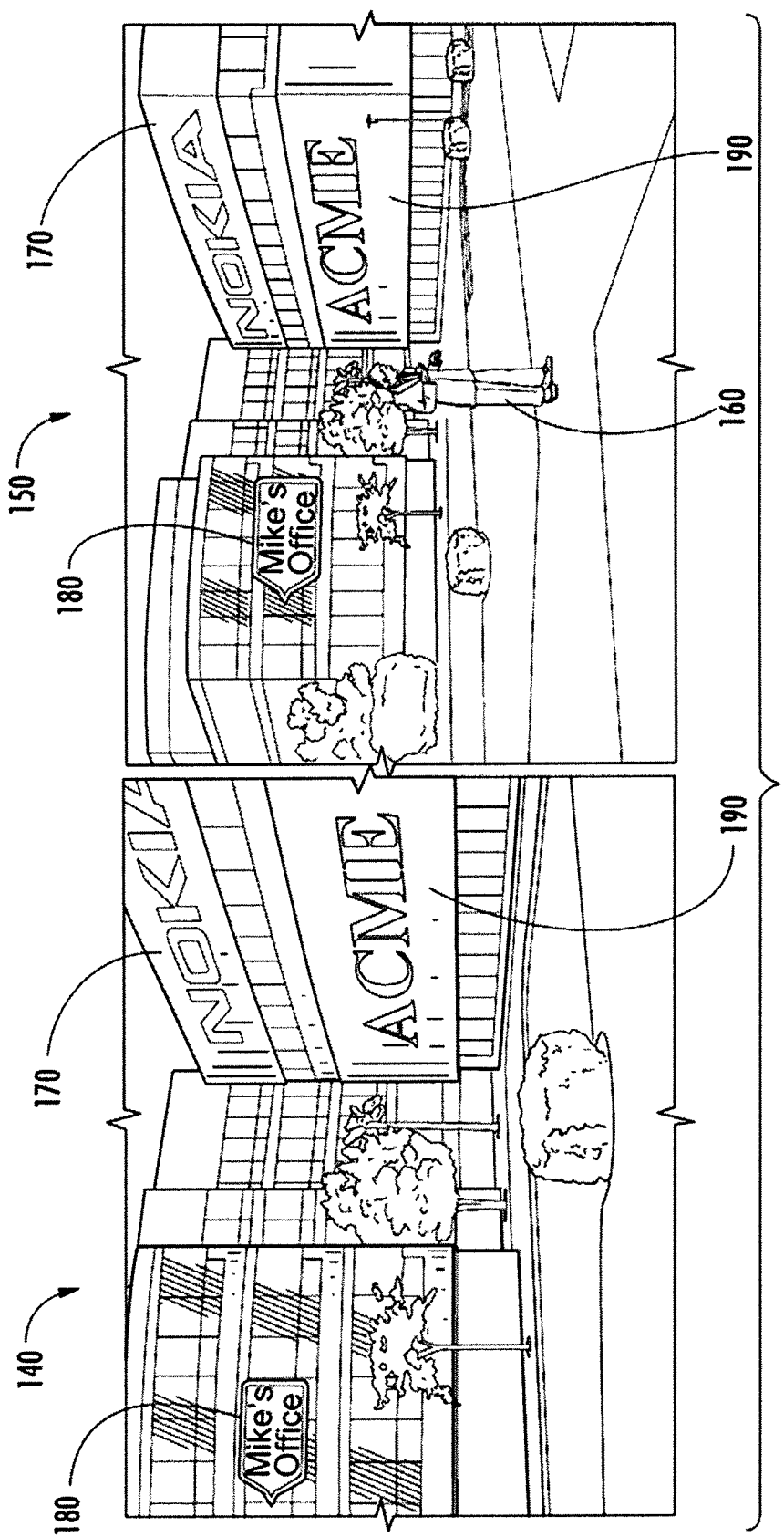
FIG. 6 illustrates an example in which the on-site view and the remote view are different based on having a different viewpoint according to an example embodiment.

As another example of providing a different view on the on-site device than the view provided on the remote device, the view manager 80 may also be configured to enable the remote device and the on-site device to have a different viewpoint (e.g., having the viewpoint of the remote device be different or offset from the viewpoint of the on-site device). In such an example, the viewpoint of the view shown at the remote device may be controllable by the user of the remote device. For example, the user of the remote device may provide an input to provide an offset (e.g., having both a magnitude and direction) from the viewpoint of the on-site user. As another example, the viewpoint of the remote device may remain fixed, while the viewpoint of the on-site device may change based on changes in position of the on-site device up to a certain threshold. Once the threshold is reached, for example, the position and viewpoint of the remote device may be updated. This also may prevent continued updating of the views of both devices and reduce communication requirements. FIG. 6 illustrates an example in which the on-site view 140 and the remote view 150 are different based on having a different viewpoint according to an example embodiment.

Thus, according to an example embodiment, the view manager 80 may be configured to select a stored image including a panoramic view based on position information and orientation information of the on-site device (e.g., mobile terminal 10). The view manager 80 may then provide first visual content (e.g., on-site view 100, 120, or 140) to be displayed at the mobile terminal based on the panoramic view and provide second visual content (e.g., remote view 110, 130, or 150) to be displayed at a remote device (e.g., the second communication device 48) based on the panoramic view. The view manager 80 may then enable collaborative interaction between a user of the mobile terminal and a user of the remote device with respect to the first visual content and the second visual content. The first visual content and the second visual content, since they are both based on the same panoramic view, may provide a shared indirect augmented reality environment in which collaborative interaction may occur between the user of the mobile terminal and the user of the remote device. The collaborative interaction may include communications (e.g., via audio, text, video or any combination thereof) regarding the shared indirect augmented reality environment, the execution of tasks, or participation in activities relative to the shared indirect augmented reality environment.

In an example embodiment like that of FIG. 5 or 6, the fact that the remote device and on-site device have different views may be indicated on one or both of the devices. In some embodiments, a position or orientation of the other device may be indicated on each device. The indication may be provided by annotations added to the view provided at one or more of the devices. In some cases, the annotations may include an avatar or other virtual representation of a user of the other device. FIG. 6 illustrates an example of such an annotation 160, which represents an avatar of the on-site user. Other annotations may represent objects or tag objects (e.g., with informational tags). Annotations 170, 180 and 190 are each overlay objects that annotate the location of various offices within the office buildings shown in FIGS. 4-6. Registration of the annotations 170, 180 and 190 to the office buildings may be relatively simpler than registering similar annotations to a live view of the office buildings since the remote and on-site views of FIGS. 4-6 are provided onto a stored panoramic image and therefore there may be less movement of the image to complicate registration. Annotations may be provided by the image modifier 82.

The image modifier 82 may be configured to provide for the inclusion of a virtual object in a panoramic image selected by the view manager 80. Thus, for example, the image modifier 82 may be configured to provide for the inclusion of virtual data such as an annotation or other virtual object with the panoramic view defined by the panoramic image. In some cases, for example, the image modifier 82 may be configured to track a location of an object within the panoramic image and either replace the object with the virtual object, cover the object (or a portion of the object) with the virtual object, or position the virtual object relative to the object. Moreover, in some embodiments, the object may be essentially removed from the image (e.g., by covering or replacing the object with a virtual object that is configured to look like the background or structure behind the object being "removed"). Furthermore, the image modifier 82 may be configured to present (or provide for presentation) a modified image for rendering at the user interface 72. The modified image may include the panoramic image selected as corresponding to the current location and orientation as modified by the image modifier 82 with one or more virtual objects overlaid or otherwise included with the panoramic image.

In some embodiments, the virtual object may be an object defined or selected by the user. For example, in some cases, the user may design a graphical element or define text or some other image that is to act as the virtual object. However, in other cases, the user may select a graphical element, text, an object from an image or any other visually perceptible object for use as the virtual object. Once the virtual object is defined (or perhaps multiple virtual objects have been defined), the virtual object may be placed on the panoramic image (e.g., as an overlay) at a location selected by the user or at a location associated with a particular real object or feature within the panoramic image. As such, in some embodiments, the image modifier 82 may be configured to associate the virtual object with an object within the panoramic view. In other words, the virtual object may be registered to the object in order to be associated with the object regardless of the view change or the change in position of the object relative to the current field of view. Thus, for example, if the position of the object in the field of view moves (e.g., due to motion of the mobile terminal 10 or due to changing of orientation of the mobile terminal 10), the position of the virtual object may change correspondingly within the current field of view. Additionally, if the position of the mobile terminal 10 changes such that the scale of the object changes (e.g., if the user moves away from the object or closer to the object), the image modifier 82 may be configured to adjust the scale of the virtual object accordingly.

Thus, for example, if the object is a building or sign and the virtual object is a banner or graphical element to be placed on the object or over the sign, the virtual object may be scaled to fit on or over the object from the image. Tracking of the object (e.g., by the image modifier 82) may be much easier than tracking of the object within a live image. Thus, correlating the virtual object to the object in image data that is provided for presentation at the display 28 may be handled with less processing power than is required for an augmented reality presentation of the virtual object over a live image. However, since the panoramic image may be selected as an image approximating the view that would likely be presented if a live image were displayed anyway, the user may still have a positive experience with respect to the indirect augmented reality environment presented on the display 28. As such, some embodiments may essentially replace the real panoramic view with a virtual panoramic view, which may be a time shifted panoramic view by virtue of the virtual panoramic view being a previously stored image of approximately the same location (with approximately the same orientation). Thus, example embodiments may essentially provide a reality shift that will not be perceptible to typical users to an extent that causes disappointment with the experience. Example embodiments may therefore provide for content (e.g., virtual objects) to be tailored to the panoramic view that has been selected without concern over registration error due to tracking difficulties. The content may therefore be overlaid with less error and/or without being occluded by real world objects.

Accordingly, example embodiments may be used to modify images of particular locations with advertisements or personalized content. Alternatively or additionally, images of particular locations may be modified to include representations of past objects (including buildings, vegetation, historical objects, people and/or the like) that correspond to the way the particular location may have appeared in the past. Similarly, a particular location may be modified to illustrate potential future objects to guess at what the location may look like in the future. In some cases, annotations may be used to indicate the virtual presence of other people (e.g., the remote device user, the on-site user, artificial intelligence entities, and/or the like) game content, tour content, content added to reflect actual updates to a stored panoramic view, and/or the like. Numerous other business-related, entertainment-related, or social content sharing-related uses may also be realized using various example embodiments.

Accordingly, in some embodiments, a device display may be enabled to provide an indirect augmented reality environment in which a panoramic image taken previously at a location near the current location and with a device orientation similar to the current location is used as the basis for the mixed reality display presentation provided at two or more devices including at least one on-site device and at least one remote device. The panoramic image may replace a live image for use in presentation of the indirect augmented reality environment. However, since the display presents an indirect augmented reality environment on a stored image, the devices providing the display need not actually even have a camera itself in some cases. By using a stored panoramic image, tracking may be less complex than using a live image and virtual objects may be more reliably presented in a fashion that consistently enhances the user experience.

Some example embodiments may be employed to enable collaborative experiencing of various locations that need not be pre-prepared or pre-modeled locations. Thus, for example, certain games may be enhanced by including location based aspects in an alternate reality gaming environment. The remote user may be enabled to participate in the game at a PC while the on-site user provides the presence needed for participation in the location based gaming environment. The difference between the experiences of the remote and on-site users may, in some cases, interject a dynamic that may provide fertile ground for game development. Some example embodiments may also be useful in touring environments (e.g., museums, historic places, nature trails, and/or the like). In some cases, the on-site user may receive expert tour guidance (or guidance from a friend) from a remote guide who may be virtually present on the tour via execution of an example embodiment. The tour guide may be enabled to direct the on-site user as to where to go and provide commentary regarding the locations and objects encountered. This could also work for the provision of directions to a friend (e.g., the on-site user) that is lost or otherwise seeking navigation help from an experienced friend or professional with knowledge of the location of the on-site user. As an alternative, the guide may be the on-site user and may give a tour to a remote user.

In other example embodiments, on-site data collection or scouting may be accomplished to provide reports back to a command center (e.g., the remote device) with respect to annotations to be added to make the virtual environment more closely represent current conditions at the location of the on-site device. Some example embodiments may enable real-time vacation sharing where on-site users share experiences with remote friends or relatives in real time. Example embodiments may also be used to support in-situ telepresence in unprepared environments. For example, single or multiple remote users may collaborate with an on-site user with respect to a task occurring at the location of the on-site user. Tasks may include architectural design, infrastructure inspection, or other more consumer driven activities. Many other use cases may also be supported by example embodiments.

As such, example embodiments may enable remote and on-site collaboration in virtually any environment for which panoramic images of the area are available. No other location modeling or preparation may be required. Thus, collaboration may be provided in a shared virtual space that may represent the actual space relatively well so that the on-site user's experience is still good. Moreover, since both the on-site user and the remote user may experience the same type of content (e.g., displayed views of potentially augmented or annotated panoramic images), example embodiments provide for a more symmetric experience for the on-site and remote users.

Figure 7:
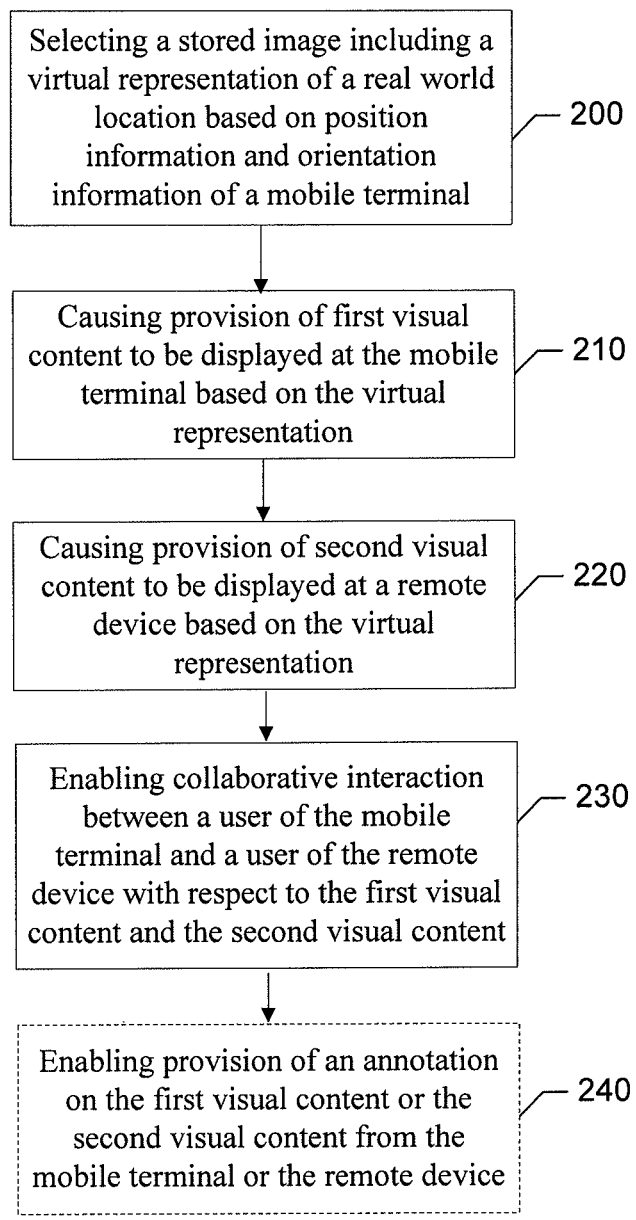
FIG. 7 is a block diagram according to an example method for providing collaboration between remote and on-site users of indirect augmented reality according to an example embodiment of the present invention.

FIG. 7 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instructions for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method according to an example embodiment as shown in FIG. 7 may include selecting a stored image including a virtual representation of a real world location (e.g., a panoramic view) based on position information and orientation information of the on-site device at operation 200. The method may further include causing provision of first visual content to be displayed at the mobile terminal based on the virtual representation at operation 210 and causing provision of second visual content to be displayed at a remote device based on the virtual representation at operation 220. The method may further include enabling collaborative interaction between a user of the mobile terminal and a user of the remote device with respect to the first visual content and the second visual content at operation 230. The first visual content and the second visual content, since they are both based on the same panoramic view, may provide a shared indirect augmented reality environment in which collaborative interaction may occur between the user of the mobile terminal and the user of the remote device. The collaborative interaction may include communications (e.g., via audio, text, video or any combination thereof) regarding the shared indirect augmented reality environment, the execution of tasks, or participation in activities relative to the shared indirect augmented reality environment.

In some embodiments, certain ones of the operations above may be modified or further amplified as described below. Moreover, in some embodiments additional optional operations may also be included (an example of which is shown in dashed lines in FIG. 7). It should be appreciated that each of the modifications, optional additions or amplifications below may be included with the operations above either alone or in combination with any others among the features described herein. In some embodiments, the method may further include enabling provision of an annotation on the first visual content or the second visual content from the mobile terminal or the remote device at operation 240. In such an example, enabling provision of the annotation may include enabling provision of an avatar of the user of the remote device on a display of the mobile terminal or displaying an avatar of the user of the mobile terminal on a display of the remote device. In an example embodiment, selecting the stored image may include selecting the stored image based on position information and orientation information provided by the mobile terminal. In some embodiments, the first visual content and the second visual content match. However, in some cases, the first visual content and the second visual content share a common viewpoint, but have a different orientation. In still other example cases, the first visual content has a different viewpoint than the second visual content.

In an example embodiment, an apparatus for performing the method of FIG. 7 above may comprise a processor (e.g., the processor 70) configured to perform some or each of the operations (200-240) described above. The processor 70 may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the view manager 80 or the image modifier 82. Additionally or alternatively, at least by virtue of the fact that the processor 70 may be configured to control or even be embodied as the view manager 80 and the image modifier 82, the processor 70 and/or a device or circuitry for executing instructions or executing an algorithm for processing information as described above may also form example means for performing operations 200-240.

An example of an apparatus according to an example embodiment may include at least one processor and at least one memory including computer program code. The at least one memory and the computer program code may be configured to, with the at least one processor, cause the apparatus to perform the operations 200-240 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-240 (with or without the modifications and amplifications described above in any combination).

In some cases, the operations (200-240) described above, along with any of the modifications may be implemented in a method that involves facilitating access to at least one interface to allow access to at least one service via at least one network. In such cases, the at least one service may be said to perform at least operations 200 to 240.

In some cases, the operations (200-240) described above, along with any of the modifications may be implemented in a method that involves facilitating access to at least one interface to allow access to at least one service via at least one network. In such cases, the at least one service may be said to perform at least operations 200 to 240.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one hardware processor and at least one memory including computer program code, the at least one memory and the computer program code configured to, with the processor, cause the apparatus to at least:

select a stored image including a virtual representation of a real world location based on position information and orientation information of a mobile terminal;

cause provision of first visual content to be displayed at the mobile terminal based on the virtual representation;

cause provision of second visual content to be displayed at a remote device based on the virtual representation;

permit a view of one of the first or second visual content to be changed while causing a view of the other of the first or second visual content to remain unchanged such that the views of the first and second visual content that are displayed at the mobile terminal and the remote device, respectively, become different;
determine whether a threshold is satisfied, wherein the threshold relates to a change in orientation of one of the mobile terminal or the remote device upon which the view of the one of the first or second visual content is permitted to be changed while the view of the other of the first or second visual content has remained unchanged;
in an instance in which the threshold is satisfied, cause the view of the other of the first or second visual content to be updated; and
enable collaborative interaction between a user of the mobile terminal and a user of the remote device with respect to the first visual content and the second visual content.

2. The apparatus of claim 1, wherein the memory and computer program code are configured to, with the processor, cause the apparatus to select the stored image based on position information and orientation information provided by the mobile terminal.

3. The apparatus of claim 1, wherein the first visual content and the second visual content match.

4. The apparatus of claim 1, wherein the first visual content and the second visual content share a common viewpoint, but have a different orientation.

5. The apparatus of claim 1, wherein the first visual content has a different viewpoint than the second visual content.

6. The apparatus of claim 1, wherein the memory and computer program code are further configured to, with the processor, cause the apparatus to enable provision of an annotation on the first visual content or the second visual content from the mobile terminal or the remote device.

7. The apparatus of claim 6, wherein the memory and computer program code are configured to, with the processor, cause the apparatus to cause provision of the annotation by enabling provision of a virtual representation of the user of the remote device on a display of the mobile terminal or displaying a virtual representation of the user of the mobile terminal on a display of the remote device with the virtual representation of the user indicating the position and orientation of the user.

8. The apparatus of claim 1, wherein the virtual representation is a panoramic view of the real world location.

9. The apparatus of claim 1, wherein the apparatus is a mobile terminal and further comprises user interface circuitry configured to facilitate user control of at least some functions of the mobile terminal.

10. A method comprising:
selecting a stored image including a virtual representation of a real world location based on position information and orientation information of a mobile terminal indicative of a position and orientation, respectively, of the mobile terminal;
causing provision of first visual content to be displayed at the mobile terminal based on the virtual representation;
causing provision of second visual content to be displayed at a remote device based on the virtual representation;
permitting a view of one of the first or second visual content to be changed while causing a view of the other of the first or second visual content to remain unchanged such that the views of the first and second visual content that are displayed at the mobile terminal and the remote device, respectively, become different;
determining whether a threshold is satisfied, wherein the threshold relates to a change in orientation of one of the mobile terminal or the remote device upon which the view of the one of the first or second visual content is permitted to be changed while the view of the other of the first or second visual content has remained unchanged;
in an instance in which the threshold is satisfied, causing the view of the other of the first or second visual content to be updated; and
enabling collaborative interaction between a user of the mobile terminal and a user of the remote device with respect to the first visual content and the second visual content.

11. The method of claim 10, wherein selecting the stored image comprises selecting the stored image based on position information and orientation information provided by the mobile terminal.

12. The method of claim 10, wherein the first visual content and the second visual content match.

13. The method of claim 10, wherein the first visual content and the second visual content share a common viewpoint, but have a different orientation.

14. The method of claim 10, wherein the first visual content has a different viewpoint than the second visual content.

15. The method of claim 10, wherein causing provision of the annotation comprises enabling provision of a virtual representation of the user of the remote device on a display of the mobile terminal or displaying a virtual representation of the user of the mobile terminal on a display of the remote device with the virtual representation of the user indicating the position and orientation of the user.

16. The method of claim 10, wherein the virtual representation is a panoramic view of the real world location.

17. A computer program product comprising at least one non-transitory computer-readable storage medium having computer-executable program code instructions stored therein, the computer-executable program code instruction comprising program code instructions for:
selecting a stored image including a virtual representation of a real world location based on position information and orientation information of a mobile terminal indicative of a position and orientation, respectively, of the mobile terminal;
causing provision of first visual content to be displayed at the mobile terminal based on the virtual representation;
causing provision of second visual content to be displayed at a remote device based on the virtual representation;
permitting a view of one of the first or second visual content to be changed while causing a view of the other of the first or second visual content to remain unchanged such that the views of the first and second visual content that are displayed at the mobile terminal and the remote device, respectively, become different;
determining whether a threshold is satisfied, wherein the threshold relates to a change in orientation of one of the mobile terminal or the remote device upon which the view of the one of the first or second visual content is permitted to be changed while the view of the other of the first or second visual content has remained unchanged;
in an instance in which the threshold is satisfied, causing the view of the other of the first or second visual content to be updated; and enabling collaborative interaction between a user of the mobile terminal and a user of the remote device with respect to the first visual content and the second visual content.

18. The computer program product of claim 17, wherein the virtual representation is a panoramic view of the real world location.

19. The computer program product of claim 17, wherein the first visual content and the second visual content match, wherein the first visual content and the second visual content share a common viewpoint, but have a different orientation, or wherein the first visual content has a different viewpoint than the second visual content.

\* \* \* \* \*